United States Patent [19]

Nakaniwa

[11] Patent Number: 5,141,246
[45] Date of Patent: Aug. 25, 1992

[54] METHOD AND APPARATUS FOR CONTROLLING VEHICULAR SUSPENSION

[75] Inventor: Shinpei Nakaniwa, Isesaki, Japan

[73] Assignee: Japan Electronic Control Systems Co., Ltd., Isesaki, Japan

[21] Appl. No.: 652,640

[22] Filed: Feb. 8, 1991

[30] Foreign Application Priority Data

Feb. 9, 1990 [JP] Japan ................................ 2-31224

[51] Int. Cl.⁵ ............................................ B60G 11/26
[52] U.S. Cl. ................................ 280/707; 364/424.05
[58] Field of Search ...................... 280/707; 364/424.05

[56] References Cited

U.S. PATENT DOCUMENTS 4,826,205  5/1989  Kouda et al. ...................... 280/707
4,938,499  7/1990  Kawabata ............................ 280/707

OTHER PUBLICATIONS

Dr. R. Latsch et al, "Experiences with a New Method for Measuring the Engine Roughness", 1979, pp. 305 (1-15).

Primary Examiner—Kenneth R. Rice
Attorney, Agent, or Firm—Foley & Lardner

[57] ABSTRACT

A discriminating value approximately corresponding to the amount of a change in mean effective pressure is calculated on the basis of the revolution period of an internal combustion engine, and a cause for the vibration of the vehicle and conditions in driving on a rugged road are indirectly detected from a misfire-originated change in engine torque. The natural frequency of the suspension of the vehicle with the internal combustion engine mounted thereon is adjusted based on the result of the detection, thereby automatically preventing comfortable riding from being deteriorated by a misfire-originated change in torque or by a drive on a rugged road.

6 Claims, 3 Drawing Sheets

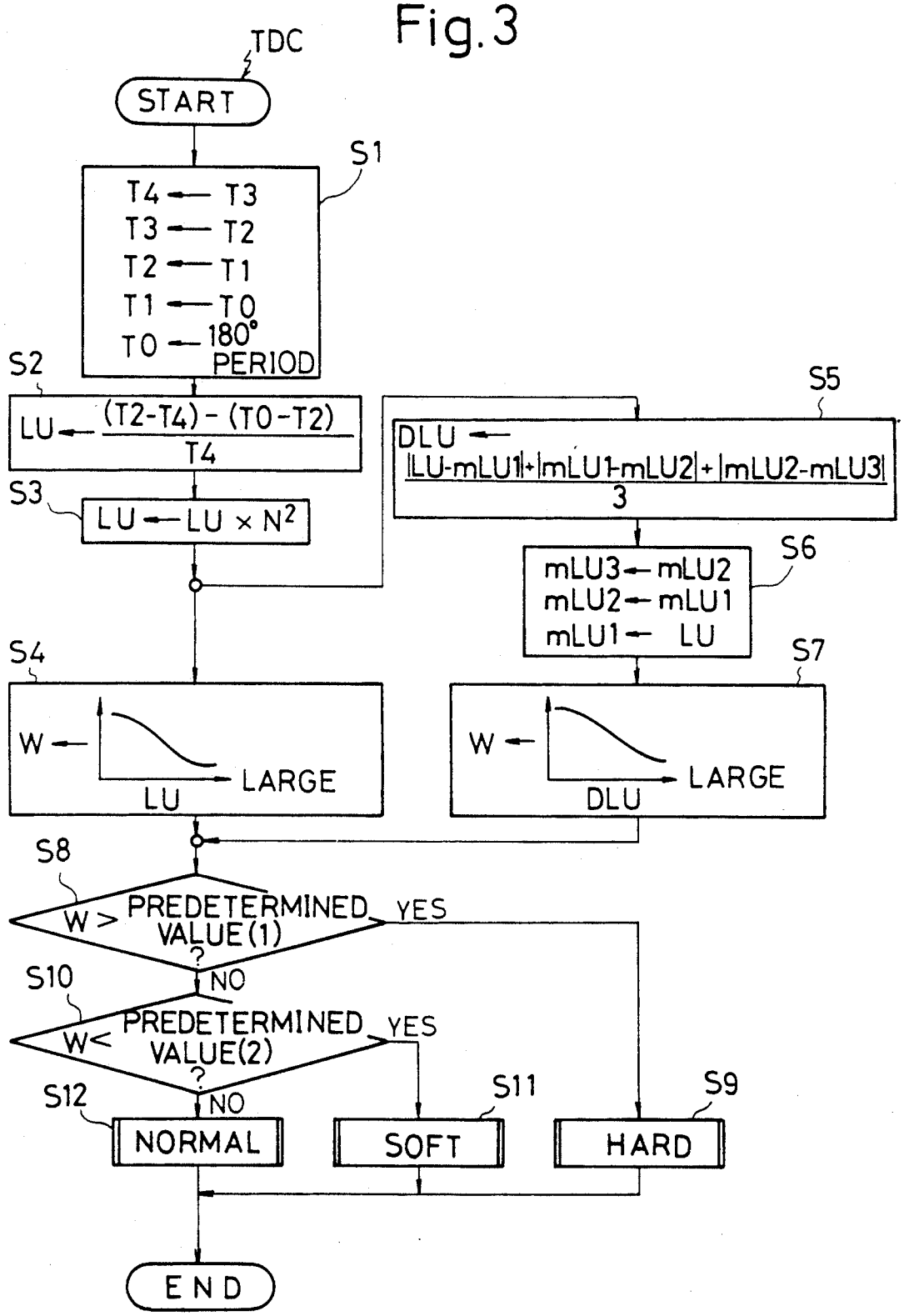

METHOD AND APPARATUS FOR CONTROLLING VEHICULAR SUSPENSION

BACKGROUND OF THE INVENTION

1. Field of the Invention

The present invention relates to a method and apparatus for controlling the suspension of a vehicle. More particularly, this invention pertains to a method and apparatus which can automatically adjust the natural frequency of the suspension of a vehicle in such a direction as to suppress uncomfortable vibration of the vehicle caused by a misfire-originated torque fluctuation or in driving on ill-conditioned (uneven) roads.

2. Description of the Related Art

To improve comfortableness in riding, suspension control apparatuses have recently been put into practice which can automatically control the spring constant or damping force (natural frequency) of the suspension in accordance with the road conditions.

The suspension control apparatus of this type is provided with a sensor to detect the road conditions; for example, an ultrasonic vehicle height sensor for directly detecting the change in vehicle height with an ultrasonic wave or a stroke type vehicle height sensor for indirectly detecting the change in vehicle height based on the magnitude amount of shrinking/expanding movement of the suspension or an angular change in suspension arms. When unevenness of a road is detected by such a height sensor, the spring constant or damping force of the suspension is adjusted in accordance with, for example, the vehicle speed at that moment to maintain the comfortable riding or drivability on rugged roads.

In an arrangement utilizing the height sensor for detecting the road's unevenness as described above, however, such a sensor must be added for suspension control, thus disadvantageously increasing the manufacturing cost of the vehicle.

The above-described automatic control of the natural frequency (spring constant or damping force) of the suspension based on the detection of variation in vehicle height can suppress the degradation of comfortable riding due to fierce vehicle vibration caused by rugged roads. This control system however has a difficulty in accurately distinguishing the vehicle vibration on a relatively low-frequency side originated from a misfire in the internal combustion engine mounted on a vehicle from the one caused by other factors. That is, this system cannot provide the proper suspension control for a misfire-originated vehicle vibration. When the vehicle body vibrates due to a change in engine output torque caused by a misfire, the comfortable riding cannot be provided by the suspension control.

SUMMARY OF THE INVENTION

It is therefore a primary object of the present invention to ensure automatic control of the natural frequency of the suspension to the proper level in accordance with the road conditions detected without using a sensor for detecting a variation in vehicle height.

It is another object of this invention to ensure adjustment of the natural frequency of the suspension in such a direction as to suppress an uncomfortable vehicle vibration occurring due to a possible misfire.

It is a further object of this invention to realize suspension control system with a simple arrangement, which can easily detect a misfire and the road conditions.

It is still further object of this invention to realize control of the natural frequency of the suspension in accordance with a change in engine's output torque.

To achieve the above objects, according to one aspect of the present invention, there is provided a vehicular suspension control method comprising the steps of detecting a misfire occurring in an internal combustion engine mounted on a vehicle, and variably controlling a natural frequency of a suspension of the vehicle based on whether or not a misfire occurring has been detected.

According to this method, when the engine output is fluctuating by a misfire occurring, the natural frequency of the suspension is varied with respect to that at the time no misfire is occurring, thereby suppressing the vibration of the vehicle originating therefrom.

A misfire occurring in the engine can be detected on the basis of a change in the engine revolution period.

Further, it is possible to predict a change in mean effective pressure of the engine from the engine revolution period and detect a misfire occurring based on this change in mean effective pressure.

According to another aspect of the present invention, there is provided a vehicular suspension control method comprising the steps of detecting a change in revolution period of an internal combustion engine mounted on a vehicle, and variably controlling a natural frequency of a suspension of the vehicle based on the detected change in revolution period.

When the vehicle runs on a very rough road and a change in frictional force between the tires and the road increases, such a vibration in frictional force will be transmitted via the power train to the engine, thus altering the revolution of the engine so that the driving on a rugged road will be indirectly detected as a change in revolution period. It is therefore possible to variably control the natural frequency of the suspension in accordance with whether or not the vehicle is presently running on a rough road to thereby keep comfortable riding and drivability even on the rugged road.

It is preferable that a change in mean effective pressure of the engine be estimated from the engine revolution period and the natural frequency of the suspension of the vehicle be adjusted based on this change in mean effective pressure.

If the change in mean effective pressure is estimated on the basis of the revolution period, the suspension can be adjusted in accordance with a change in the engine's output torque, which can be a cause for vibration of the vehicle.

According to a further aspect of the present invention, there is on the other hand provided a vehicular suspension control apparatus comprising a revolution period detecting means for detecting a revolution period of an internal combustion engine mounted on a vehicle, and a natural frequency control means for variably controlling a natural frequency of a suspension of the vehicle based on a change in the detected revolution period of the engine.

With such an arrangement, the natural frequency of the suspension of the vehicle is variably adjusted on the basis of a change in engine revolution period. When the engine revolution period is disturbed due to a misfire or via the tires and power train while the vehicle is running on a rough road, the natural frequency of the suspension can be controlled in such a direction to suppress the vibration of the vehicle.

The suspension control apparatus can be designed such that the natural frequency control means discriminates whether or not a misfire has occurred in the engine based on a change in the revolution period detected by the revolution period detecting means, and variably controls the natural frequency of the suspension of the vehicle based on the discrimination result.

In this case, the suspension is controlled in accordance mainly with a misfire which may be or may not be occurring, thus making it possible to suppress the vibration of the vehicle originating from the misfire occurring.

Furthermore, the suspension control apparatus may be structured so that the natural frequency control means predicts a change in mean effective pressure of the engine based on the revolution period detected by the revolution period detecting means, and variably controls the natural frequency of the suspension of the vehicle based on the predicted change in mean effective pressure.

With such an arrangement, as the suspension is controlled on the basis of a change in mean effective pressure, the suspension control can be conducted more properly in such a direction to suppress the vehicle vibration.

More specifically, the natural frequency control means may be designed to include a discriminating value calculating means for computing a discriminating value corresponding to an amount of a change in mean effective pressure based on the revolution period of the engine detected by the revolution period detecting means, a control value setting means for comparing the discriminating value computed by the discriminating value calculating means with a predetermined value and selectively set control values associated with the natural frequency, and a natural frequency adjusting means for adjusting the suspension based on the control value associated with the natural frequency, selectively set by the control value setting means.

In addition, the natural frequency control means may be designed to include a discriminating value calculating means for computing a discriminating value corresponding to an amount of a change in mean effective pressure based on the revolution period of the engine detected by the revolution period detecting means, a change order calculating means for computing an order of a change in the discriminating value calculated by the discriminating value calculating means, a control value setting means for comparing the order of a change in the discriminating value computed by the change order calculating means with a predetermined value to selectively set control values associated with the natural frequency, and a natural frequency adjusting means for adjusting the suspension based on the control value associated with the natural frequency, selectively set by the control value setting means utilizing the order of a change.

As described above, if a discriminating value which corresponds to the amount of a change in mean effective pressure, or the order of a change in the discriminating value, is compared with a predetermined value to set a control value associated with the natural frequency, the natural frequency of the suspension can be quantitatively controlled.

Other objects and variations of the present invention will be apparent from the following description of a preferred embodiment of the invention in conjunction with the accompanying drawings.

BRIEF DESCRIPTION OF THE DRAWINGS

FIG. 3 is a flow chart showing how to control the natural frequency of the suspension according to the above embodiment.

DETAILED DESCRIPTION OF THE PREFERRED EMBODIMENT

A preferred embodiment of the present invention will now be described referring to the accompanying drawings.

Figure 1:
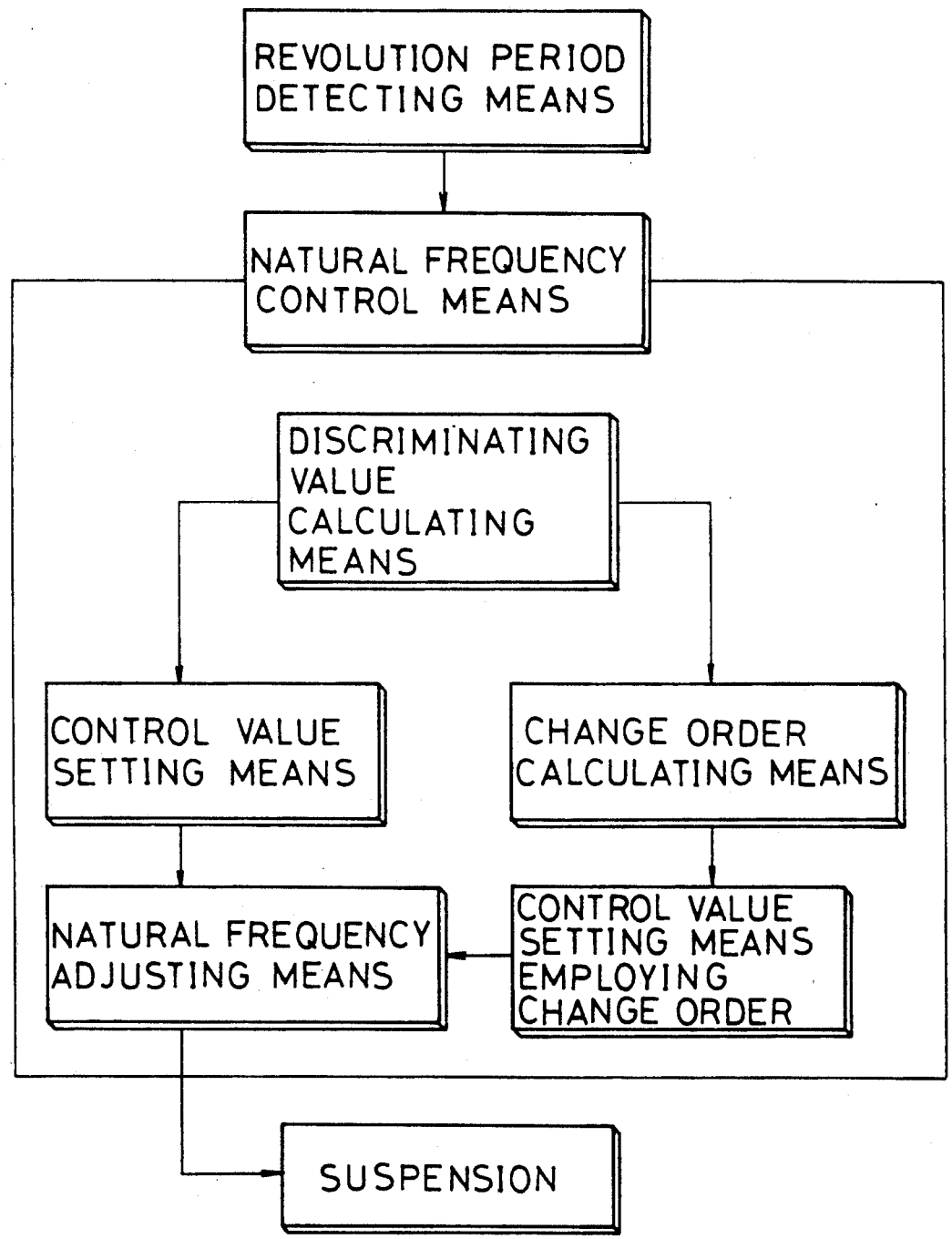
FIG. 1 is a block diagram illustrating the basic structure of a vehicular suspension control apparatus according to the present invention.
Figure 2:
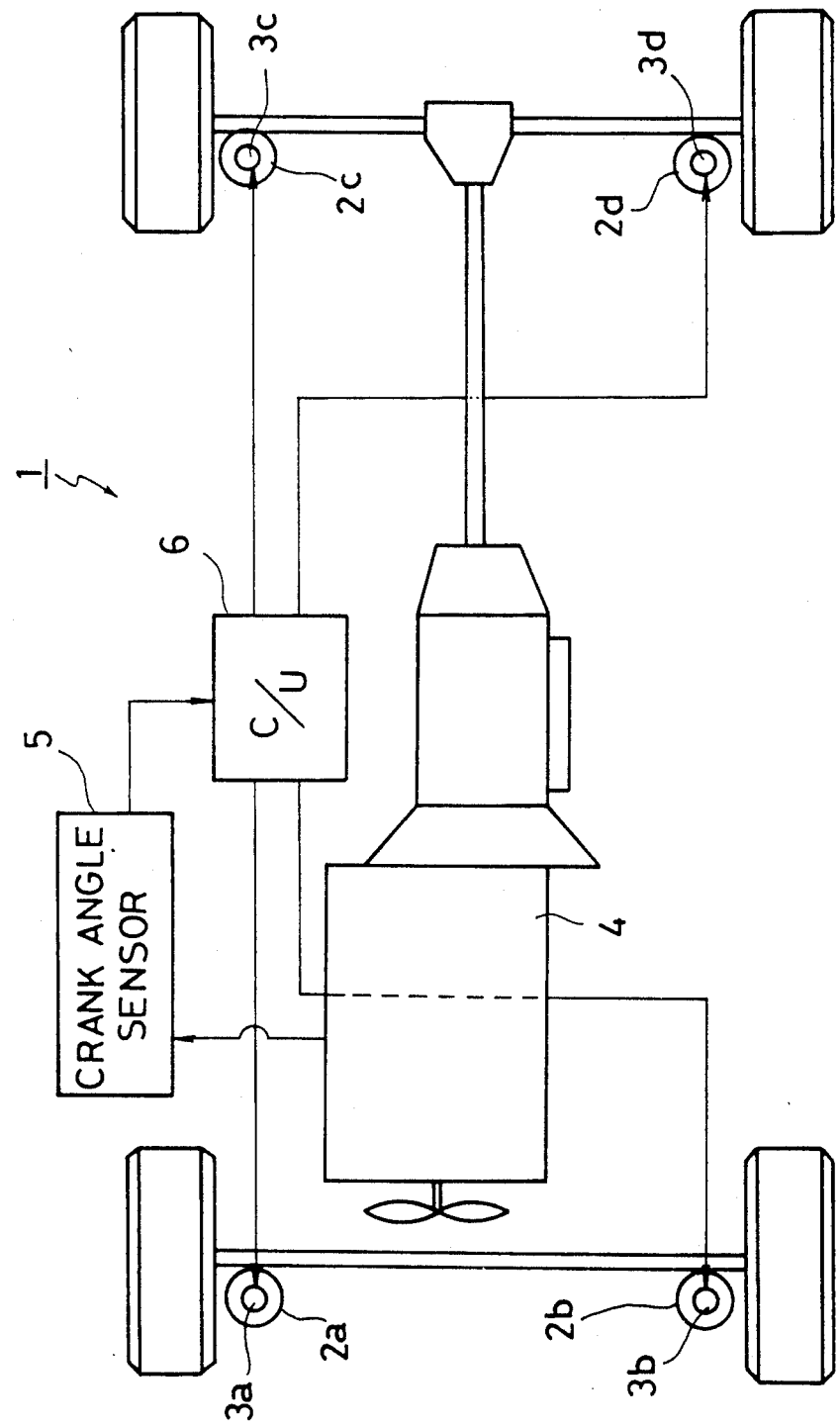
FIG. 2 is a schematic system diagram illustrating one embodiment of a suspension control method and apparatus according to the present invention.

FIG. 1 shows the basic structure of a vehicular suspension control apparatus according to the present invention, and FIGS. 2 and 3 illustrate one embodiment of the suspension control apparatus and method of this invention.

Referring to FIG. 2 illustrating the system structure of this embodiment, a suspension of a vehicle 1 comprises suspension units 2a-2d for four wheels, respectively. Each suspension unit is a combination of a coil spring and a shock absorber whose damping force is selectable. Actuators 3a-3d are each provided on the top of the associated shock absorber to select the damping force thereof.

The actuators 3a-3d serve to open and close fluid holes or change the area of the fluid passage to alter the damping force to one of three modes, Soft, Normal, and Hard, thus variably controlling the natural frequency of the suspension. Control values associated with the natural frequency of the suspension in this embodiment are drive control values corresponding to Soft, Normal, and Hard modes of each of the actuators 3a-3d to adjust the damping force.

In this embodiment, the damping force can be varied by adjusting the amount of fluid running through the shock absorber. This invention is not however limited to the above-described embodiment in controlling the natural frequency of the suspension, and may be applied to an air suspension system where the supply of compressed air is controlled to select the spring constant and the damping force.

An internal combustion engine 4 mounted on the vehicle 1 is provided with a crank angle sensor 5 as a revolution period detecting means. In the case of a four-cylinder engine as in this embodiment, a reference angle signal for each 180° is output for every compression TDC (Top Dead Center) of each cylinder.

The reference angle signal from the crank angle sensor 5 is sent to a control unit 6 which drives and controls the actuators 3a-3d. The control unit 6 selectively sets the damping force in accordance with the reference angle signal. With a control value based on the selection result, the control unit 6 controls the driving of the actuators 3a-3d to control the damping force (the natural frequency) of the suspension. The control unit 6 can also control the damping force based on the vehicle speed, the amount of accelerator operating, and the steering angle, all detected by sensors (not shown). In the following description of this embodiment, however, the control of the damping force based on the reference angle signal (engine revolution period) will only be explained referring to the program (sequence) shown in the flow chart in FIG. 3.

As indicated by the flow chart in FIG. 3, the functions of the natural frequency control means, discriminating value calculating means, control value setting means, natural frequency adjusting means, change order calculating means, and control value setting means for setting control values based on the order of a change in the discriminating value are provided as software in the control unit 6.

The program given in the flow chart in FIG. 3 illustrates how the control unit 6 controls the damping force (the natural frequency) of the suspension based on the reference angle signal. The control unit 6 executes this control upon each reception of the reference angle signal from the crank angle sensor 5, or i.e., for every TDC position of each cylinder (every 180° CA for the four-cycle four-cylinder engine of this embodiment).

In step 1 (indicated as "S1" in the flow chart; the same will be applied hereinafter), the latest value of the crank angle period 180°, which is measured as an execution period of the program, is set to T0. The data of T0 to which the latest 180° period has been set at the time of the previous execution of this program, is set to T1 as a period data of one cycle before. Likewise, based on period data which has been set at the time of the previous execution of the program, periods of two, three, and four cycles before are respectively set to T2, T3, and T4.

In the next step 2, the latest period T0 determined in step 1, T2 of two cycles before (one revolution before), and T4 of four cycles before (two revolutions before) are substituted in the following equation to compute a discriminating value LU which approximately corresponds to the amount of a change $\Delta Pi$ in mean effective pressure Pi of the engine.

$$LU = \frac{(T2 - T4) - (T0 - T2)}{T4}$$

The equation above is derived as follows. Given that M is the engine generated torque, W is the load torque, $\omega$ is the crank angle velocity, $\theta$ is the inertia moment, t is the time, T is the instantaneous value of the crank rotation period $\xi$ is the crank angle velocity, j is 0, 1, 2, 3, ..., Tj is the period of one or two crank rotations, and Tj−1 is Tj of one cycle before, $$M - W = \theta \frac{d\omega}{dt}$$

$$M - W = \theta 2\pi \frac{d(1/T)}{dt}$$

$$M - W = \theta 2\pi \frac{d(1/T)}{d\xi} \cdot \frac{d\xi}{dt}$$

Integrating the above equation for one crank rotation yields $$\int_{(j-1)2\pi}^{j2\pi} (M - W)d\xi = 2\pi^2\theta \left( \frac{1}{T_j^2} - \frac{1}{T_{j-1}^2} \right)$$

Assuming that W is a constant and $Tj = Tj-1 = Tj-2$, then $$\Delta \int_{(j-1)2\pi}^{j2\pi} Md\xi = -4\pi^2\theta \frac{\Delta(\Delta T_j)}{T_j^3}$$

As the left-hand side of the equation is proportional to the amount of a change in mean effective pressure, $\Delta Pi$, the result of the computation of the right-hand side will approximately correspond to $\Delta Pi$ (refer to ISATA-Paper "Experiences with a new method for measuring the engine roughness" 1979, by R. Latsch, E. Mausner, and V. Bianchi).

It is apparent from the right-hand side of the equation that the acceleration of the revolution period divided by the cube of the revolution period corresponds to the amount of a change in mean effective pressure. To simplify the computation in practice, the aforementioned equation of acquiring the discriminating value LU is employed.

The discriminating value LU, corresponding to the amount of a change in mean effective pressure, is calculated on the basis of the revolution period. When the engine revolution changes, should there be no change in mean effective pressure due to a misfire, the computation will be performed with this revolution change considered as originating from the change in mean effective pressure.

Accordingly, not only is the case where the mean effective pressure, actually decreased due to a misfire to fluctuate the engine's output torque, but also when the frictional force between the tires of the vehicle and the road should change due to the unevenness of the road to transmit the change back through the power train the fluctuate the engine revolution, the computation of the discriminating value will be conducted while considering the revolution change as the change in mean effective pressure.

When the discriminating value LU is large and the change in mean effective pressure is large, therefore, there are two possible causes; that is, the mean effective pressure is fluctuating by a misfire or the like; and the revolution period is disturbed by the uneven road. In either case, based on the discriminating value LU, it is possible to infer that there be some cause for the uncomfortable vibration of the vehicle.

In the subsequent step 3, the discriminating value LU acquired to step 2 is multiplied by the square of the engine revolution speed N (actually, rpm) which is computed based on the aforementioned 180° period, and the result of the compensation is taken as a new discriminating value LU. This compensation is performed to compensate for the discriminating value LU which will become greater for the same amount of a change in mean effective pressure as the engine revolution speed N is lower, because of the aforementioned, simplified equation of calculating the discriminating value LU (the "cube" of the period date T4 in the denominator being omitted).

In step 4, based on a preset map, the order of a change in engine output, W, is so set as to become larger as the absolute value of the discriminating value LU is smaller (the difference in mean effective pressure is small). Therefore, this value W being small means a change in the engine revolution period in which case it is considered that a large change in mean effective pressure has occurred. In this case, as described earlier, there may be two causes: the occurrence of a misfire and the influence of the uneven road conditions.

After the order of a change in engine output, W, is set in step 4 based on the absolute value of the discriminating value LU, it will be determined in step 8 if W is greater than a predetermined value (1). When the value W is greater than the predetermined value (1), and ΔPi, the amount of a change in mean effective pressure Pi to be determined according to a revolution period, is sufficiently small, it is judged that no misfire has occurred or the road surface is flat. The flow then advances to step 9 where the driving of the actuators 3a to 3d is controlled so that the suspension is put in Hard mode where the damping characteristic is set high.

When it is judged in step 8 that the order of a change in engine output, W, is equal to or smaller than the predetermined value (1), the flow advances to step 10 where it is determined whether or not W is smaller than a predetermined value (2) that is even smaller than the predetermined value (1). When it is judged that the value W is less than the predetermined value (2), the absolute value of the discriminating value LU is greater than a predetermined value and the amount of a change in mean effective pressure is large. This event can be considered as the revolution period disturbed due to the occurrence a misfire occurring or unevenness of the road.

In this case, therefore, the flow goes to step 11 where Soft mode is selected as the damping characteristic mode to control the damping force to a relatively low level, and the driving of the actuators 3a to 3d is controlled accordingly.

If it is expected that the misfire or the rough road surface will disturb the revolution period, reducing the damping force of the suspension can lessen the vibration occupants would feel. Thus, even with the engine output torque disturbed by the misfire or during driving on a rugged road, it is possible to automatically keep the comfortable riding.

In addition, the cause for vibration of vehicle such as a misfire or unevenness of a road can be detected based on the detection result from the crank angle sensor 5 which is generally provided for ignition control and electronic fuel injection control of the engine 4. It is therefore unnecessary to particularly provide a road sensor, such as a vehicle height sensor for controlling the damping force of the suspension, thus providing an advantage in manufacturing cost.

When it is judged in step 10 that the order of a change in engine output, W, is equal to or greater than the predetermined value (2), which means that W lies between the predetermined values (1) and (2), then the flow advances to step 12 to select Normal mode where the damping force is set to a level approximately midway between Hard and Soft modes. In accordance with Normal mode, the driving of the actuators 3a to 3d is controlled.

In the above embodiment, W, the order of a change in engine output is set directly based on the absolute value of the discriminating value LU. However, the value W may be determined by calculating the order of a change in discriminating value LU to be based on.

In this case, the flow will move to step 5 after the discriminating value LU is compensated with the engine revolution velocity N.

In step 5, after calculating (|LU−m1|), the absolute value of the previous value mLU1 subtracted from the discriminating value LU calculated this time in step 2, (|mLU1−mLU2|), the absolute value of the discriminating value LU2 of two cycles before subtracted from the previous value mLU1, and (|mLU2−mLU3|), the absolute value of the discriminating value mLU3 of three cycles before subtracted from the discriminating value mLU2, the average of these absolute values is acquired and set to DLU.

In step 6, while the discriminating value LU calculated this time in step 2 is set to the previous value mLU1 to prepare for the next computation in step 5, the previous value mLU1 used for the computation in step 5 is set to the value mLU2 of two cycles before, and the value mLU2 of two cycles before is set to the value mLU3 of three cycles before.

In step 7, the order of a change in engine output, W, is retrieved from the map, based on DLU which indicates the order of a change in discriminating value LU calculated in step 5. In this case too, the value W is set large when the discriminating value LU is almost constant and DLU is small and, in turn is set small when the discriminating value LU has changed greatly and DLU is large.

After the value W is determined in step 7, the flow will go to step 8 or further as in the case of setting the value W in step 4, where W is compared with the predetermined value (1) or with the predetermined value (2), whereby the proper damping force of the suspension is selected from Hard, Normal and Soft modes.

According to this embodiment, though the discriminating value LU changes in both of the cases where a misfire has occurred and where the road surface is rugged, and it is not possible to distinguish the causes for this change in LU, so that the damping force of the suspension is selected based on the change in LU to thereby permit comfortable riding to be maintained in the case of the misfire as well as driving on an uneven road. To select the proper damping force of the suspension based only on a misfire which may be or may not be occurring, however the internal pressure in each cylinder may be directly detected by a cylinder pressure sensor provided for each cylinder, so that the natural frequency of the suspension can be variably controlled on the basis of the detection result. It should therefore be noted that the misfire detecting method in the case of controlling the suspension based on misfire detection is not limited to the one involving the detection of the revolution period.

In the case where a misfire is detected based on the engine revolution period and the natural frequency of the suspension is variably controlled in accordance with the detection result, a misfire occurring may be detected by checking if the revolution period becomes longer because of the misfired cylinder, instead of calculating the discriminating value LU corresponding to the amount of a change in mean effective pressure as done in the above-described embodiment.

What is claimed is:

1. A vehicular suspension control method comprising the steps of:
   detecting a misfire occurring in an internal combustion engine mounted on a vehicle; and
   variably controlling a natural frequency of a suspension of the vehicle based on whether or not a misfire occurring has been detected.

2. A vehicular suspension control method according to claim 1, wherein a misfire occurring in the engine is detected based on a change in engine revolution period.

3. A vehicular suspension control method according to claim 1, wherein a misfire occurring in the engine is detected based on a change in mean effective pressure of the engine which is predicted based on an engine revolution period.

4. A vehicular suspension control comprising:
means for detecting a misfire occurring in an internal combustion engine mounted on a vehicle; and
means for variably controlling a natural frequency of a suspension of the vehicle based on whether or not a misfire has been detected.

5. A vehicular suspension control according to claim 4 wherein said means for detecting detects a misfire in the engine based on a change in engine revolution period.

6. A vehicular suspension control according to claim 4 wherein said detecting means detects a misfire in the engine based on a change in mean effective pressure of the engine which is predicted based on an engine revolution period.

* * * * *